United States Patent
Kokje et al.

(10) Patent No.: US 7,995,481 B2
(45) Date of Patent: Aug. 9, 2011

(54) HOP COST AS SECONDARY METRIC FOR EQUAL COST MULTI-PATHS

(75) Inventors: Tejas Kokje, Santa Clara, CA (US); Ankur Goyal, San Jose, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 207 days.

(21) Appl. No.: 12/221,143

(22) Filed: Jul. 31, 2008

(65) Prior Publication Data

US 2010/0027427 A1 Feb. 4, 2010

(51) Int. Cl.
*G01R 31/08* (2006.01)
(52) U.S. Cl. ........................... 370/238; 709/241
(58) Field of Classification Search .......... 370/431–546, 370/238–238.1, 299, 323–328, 352–356, 370/357–388, 391–427; 709/241
See application file for complete search history.

(56) References Cited

U.S. PATENT DOCUMENTS

| | | | | |
|---|---|---|---|---|
| 5,598,532 | A * | 1/1997 | Liron | 703/2 |
| 6,697,333 | B1 * | 2/2004 | Bawa et al. | 370/238 |
| 2004/0047294 | A1 * | 3/2004 | Ain et al. | 370/238 |
| 2007/0286097 | A1 * | 12/2007 | Davies | 370/255 |

* cited by examiner

*Primary Examiner* — Ricky Ngo
*Assistant Examiner* — Iqbal Zaidi
(74) *Attorney, Agent, or Firm* — Patterson & Sheridan, LLP (57) ABSTRACT

Systems, methods, and other embodiments associated with computing path costs based on link cost as a primary metric and hop cost as a secondary metric are presented. The secondary metric facilitates distinguishing between what would be equal cost multi-paths if only link cost was employed. One example method includes computing a modified link cost for a plurality of paths between switches. The example method may also include determining a lowest modified link cost associated with a path between the switches. The example method may also include providing a signal identifying the lowest modified link cost.

13 Claims, 5 Drawing Sheets

HOP COST AS SECONDARY METRIC FOR EQUAL COST MULTI-PATHS

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Fabric Shortest Path First (FSPF) protocol in Fibre Channel networks is a link state path selection protocol that uses link cost as a metric while calculating routes through a network. Link cost in FSPF is calculated using the bandwidth of the link between the switches. FSPF keeps track of the state of the links between switches in the fabric. The protocol computes the total cost of multiple paths from a switch to the other switches in the fabric by adding the cost of the individual links traversed by the path and choosing the path with the lowest cost. FSPF networks are often built to have multiple data paths between switches in a network of switches. This increases the available bandwidth to destination while providing redundancy to deal with failures.

When networks are built with multiple data paths, they may have multiple equal cost multi-paths (ECMPs) between an origin and a destination. ECMPs describe a routing situation where packet forwarding to a single destination from a single origin can occur over multiple "best paths." In ECMPs, the best paths have the lowest cost, where cost is determined by bandwidth. As the bandwidth of a link increases, the cost decreases. However, when only bandwidth is used to calculate the cost of a link, it is possible to have multiple paths with identical costs even though there might be different numbers of switches along each individual ECMP. It is not always desirable to consider paths with different numbers of switches as ECMPs even though they have the same lowest cost as determined by bandwidth alone. This is even more poignant when some of the links are long distance WAN links.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example systems and methods determine a lowest cost path between switches by considering not only the sum of link costs along a path but also the number of hops in the path. A conventional lowest cost path determination may only consider the sum of link costs. Thus, a conventional lowest cost path determination may identify a set of equal cost multi-paths where a path may include different numbers of hops. By also considering the number of hops in a path, an equal cost multi-path having a smallest number of hops may be identified as a lowest cost path.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result. It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates, transforms, and/or relays data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
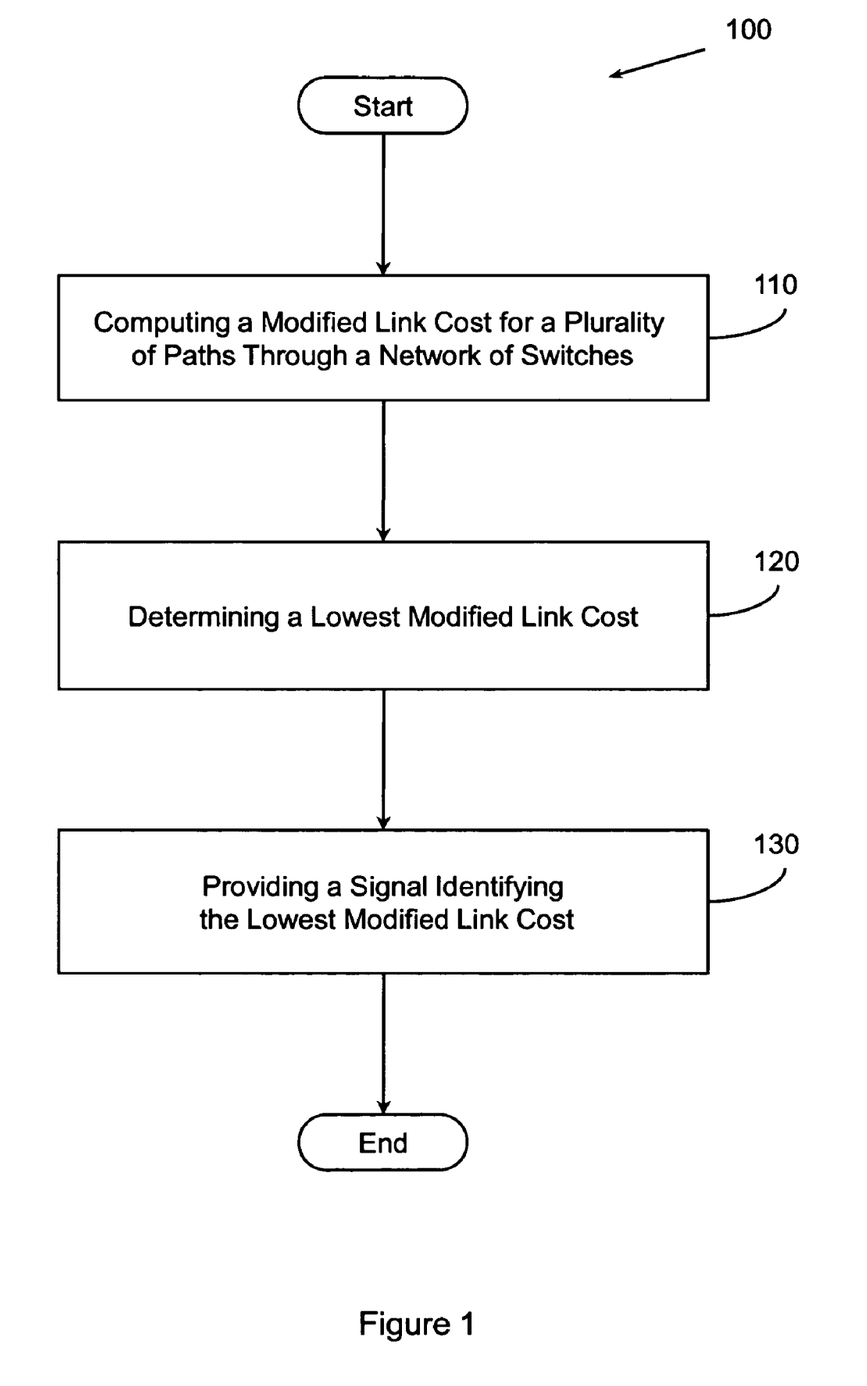
FIG. 1 illustrates an example method associated with adding hop cost as a secondary metric for computing path costs.

FIG. 1 illustrates a method 100 associated with adding hop cost as a secondary metric for computing a path cost. The secondary metric may facilitate selecting between otherwise equal cost multi-paths. Method 100 may include calculating a modified link cost for paths between switches, determining the lowest modified link cost, and selecting the path of the lowest modified link cost.

Method 100 may include, at 110, computing a modified link cost for a plurality of paths between switches. Computing a modified link cost may include adding a hop cost to a link cost calculation. A link cost may be calculated based on the baud rate (e.g. signaling rate) of the link, plus an administratively set factor. One example of the link cost calculation is:

$$\text{Link Cost} = S*(1.0625e12/\text{Signaling Rate})$$

The link cost calculation may compute the cost for an individual link. The link cost of a path may be the total of the individual link costs for the links through the path. The modified link cost calculation may include a hop cost to account for the fact that data also travels through switches. For example, the modified link cost formula for the FSPF link cost calculation may be as follows:

$$\text{Modified Link Cost} = S*(1.0625e12/\text{Signaling Rate}) + K_{switch}$$

$K_{switch}$ is the constant cost of traversing through a switch. In one embodiment the switches in the network use the same value for $K_{switch}$. $K_{switch}$ may be the hop cost associated with transitioning (e.g. hopping) a switch. In one example, $K_{switch}$ will be set to one for all switches in a network for which the modified link cost approach is applied to compute path cost. The modified link cost for a path may be based, at least in part, on an administrative factor for a link divided by the signaling rate of the link. In one example, the administrative factor may be multiplied by 1.0625e12. One skilled in the art will understand that other administrative factors may also be used. Additionally, the modified link cost may be based, at least in part, on a hop cost (e.g. $K_{switch}$) that is determined, at least in part, by the number of hops in the path. In one example, the hop cost is the total of individual hop costs for hops in a path. An individual hop cost may be a constant for switches in the network. In another example, the individual hop cost for a switch is one and the hop cost for a path is the number of links traversed in the path minus one. While a "switch" is described, it is to be appreciated that the term "switch" may refer to devices performing a switching function, not just an actual switch device.

Method 100 may also include, at 120, determining a lowest modified link cost associated with a path between the switches. For example, the method may calculate the modified link cost of the different paths and compare these values to a lowest modified link cost. If a new modified link cost is lower than the previous lowest modified link cost, the new modified link cost and its associated path replace the previous lowest modified link cost as the lowest cost path. In another example, all modified link costs may be calculated and then the lowest cost selected by, for example, a single iteration of a modified selection sort. One skilled in the art will appreciate that there are various ways to select a lowest value from a set of values.

Method 100 may also include, at 130, providing a signal identifying the lowest modified link cost. "Signal", as used herein, includes but is not limited to, electrical signals, optical signals, analog signals, digital signals, data, computer instructions, processor instructions, messages, a bit, a bit stream, and so on, that can be received, transmitted and/or detected. Providing the signal may facilitate identifying a path to establish, controlling a downstream logic to establish a path using data in the signal, and so on.

In another example, method 100 may also include establishing a path using the lowest modified link cost identified in the signal. Establishing a path may include routing data through the network of switches along the path identified by the signal as having the lowest modified link cost. Using the lowest cost path as the established path may provide the most desirable routing path for data flow in the network. Establishing a path may also include controlling a set of switches and/or routers to control data (e.g., packets) to be routed from switch to switch according to the lowest modified link cost path identified in the signal.

While FIG. 1 illustrates various actions occurring in serial, it is to be appreciated that various actions illustrated in FIG. 1 could occur substantially in parallel. By way of illustration, a first process could calculate a modified link cost for paths between switches, a second process could determine the lowest modified link cost, and a third process could provide a signal identifying the lowest modified link cost. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a logic encoded in a tangible media for execution may store computer executable instructions that if executed by a machine (e.g., processor) cause the machine to perform a method. While executable instructions associated with the above method are described as being stored on a logic encoded in tangible media for execution, it is to be appreciated that executable instructions associated with other example methods described herein may also be stored on a logic encoded in tangible media for execution. "Logic encoded in one or more tangible media for execution", as used herein, refers to a medium that stores signals, instructions and/or data. A tangible media for execution may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a tangible media for execution may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

Figure 2:
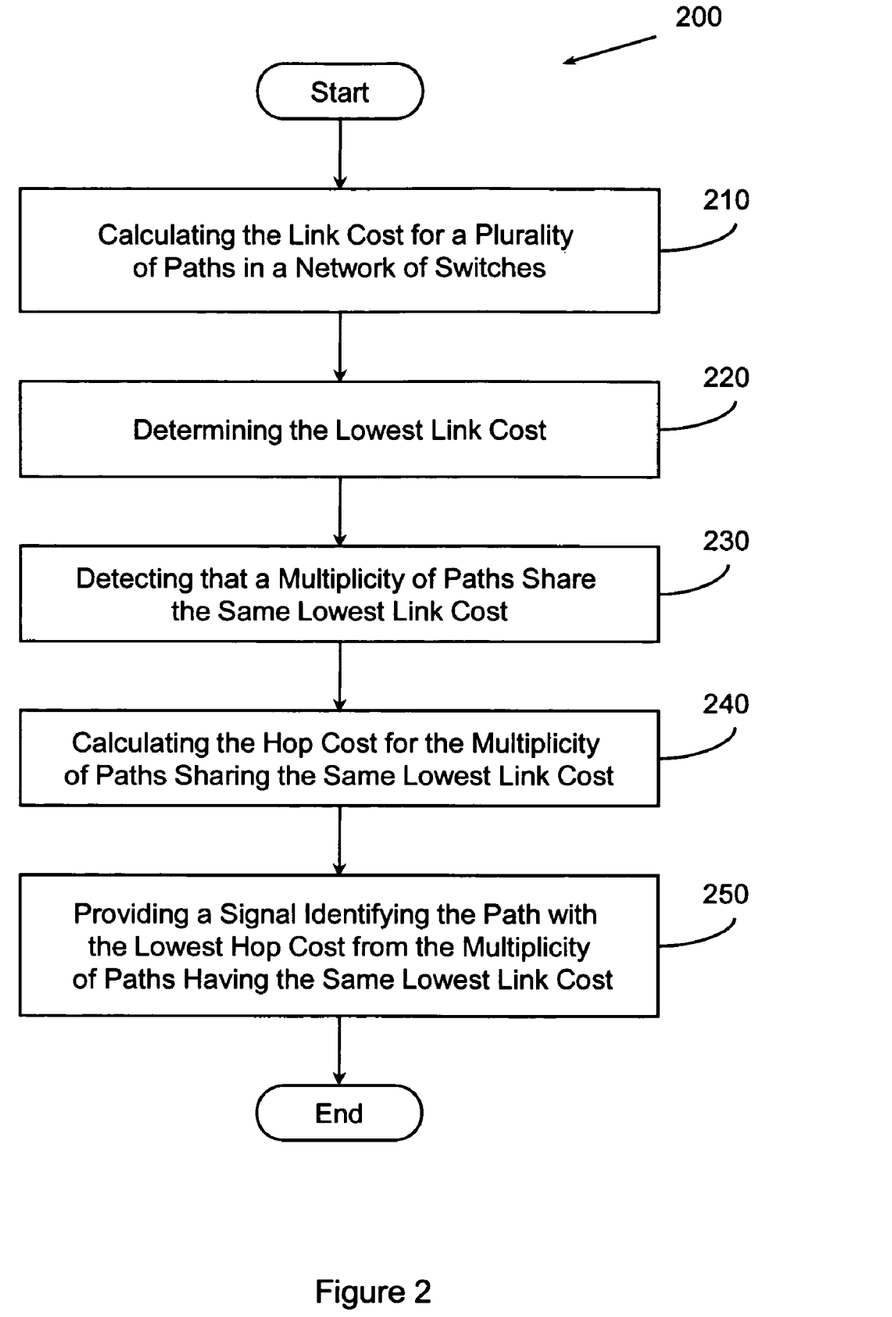
FIG. 2 illustrates an example method associated with adding hop cost as a secondary metric for computing path costs.

FIG. 2 illustrates a method 200 associated with computing a path cost that includes hop cost as a secondary metric. Computing link cost using the secondary metric hop cost may facilitate selecting between otherwise equal cost multi-paths. Method 200 may include, at 210, calculating a link cost for a plurality of paths in a network of switches. The link cost is the cost of traversing links between switches on a path through the network. For example, the link cost may be calculated based on the baud rate (e.g. signaling rate) of the link and an administratively set factor. One example of the link cost calculation is:

$$\text{Link Cost} = S*(1.0625e12/\text{Signaling Rate})$$

This link cost calculation may calculate the cost for an individual link. The link cost of a path may be the total of the individual link costs for the links through the path.

Method 200 may also include, at 220, determining a lowest link cost associated with a path through the network of switches. In one example, the link cost is the total of individual link costs of the links on a path through the network.

Method 200 may also include, at 230, detecting that a multiplicity of paths share the same lowest link cost. For example, the method may calculate the link cost of the different paths and compare these values to a lowest link cost. If a new link cost is equal to the previous lowest link cost, the new link cost and its associated path are stored with the previous lowest link cost path. A logic may detect that a multiplicity of paths have been stored as the lowest link cost. If a multiplicity of paths have the same lowest link cost, then the modified link cost may be computed for the multiplicity to facilitate selecting between them.

Therefore, method 200 may also include, at 240, calculating a hop cost for the multiplicity of paths sharing the same lowest link cost. The hop cost may be determined by totaling the individual hop cost for hops on the multiplicity of paths. In one example, the hop cost is the number of switches traversed on a path through the network. In another example, the individual hop cost for a switch is a constant. In yet another example, the constant individual hop cost for a switch is one and the hop cost for a path is the number of links traversed in the path minus one (e.g. the number of switches that are traversed). In this example, the hop cost may be the number of switches traversed in the path.

Method 200 may also include, at 250, providing a signal identifying the path with the lowest hop cost from the multiplicity of paths that share the lowest link cost. For example, the method 200 may compare the hop costs of the multiplicity of paths calculated at 240 to a lowest hop cost that may be initialized as the first hop cost. If a new hop cost is lower than the previous lowest hop cost, the new lowest hop cost and its associated path replace the previous lowest hop cost. This comparison is performed for the multiplicity of paths to find the path with the lowest hop cost. Once the lowest cost is selected, it may be identified in the signal provided at 250.

Method 200 may also include establishing a path using the lowest hop cost identified in the signal provided at 250. Establishing a path may include routing data through the network of switches along the path identified by the signal as having the lowest hop cost. The routing data may be stored in a memory somewhere in the network (e.g. in a network switch) for later retrieval and use by a data routing system, method, program, and so on. In one example, the hop cost and the link cost may be stored as an XML attribute:value pair. XML refers to extensible markup language. While storing values in an XML attribute:value pair is described, one skilled in the art will appreciate that hop cost and link cost and other values may be stored. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag.

Figure 3:
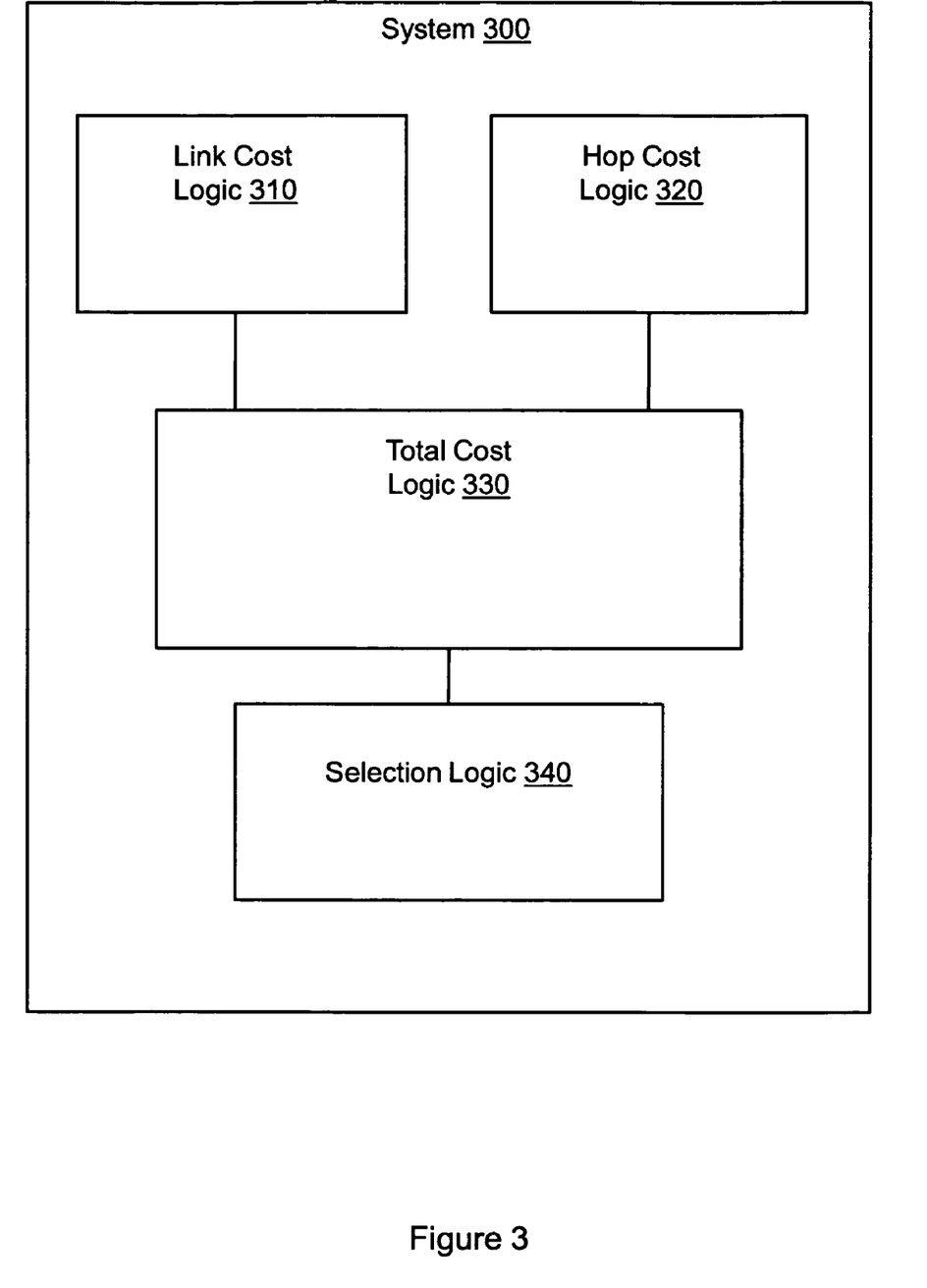
FIG. 3 illustrates an example system associated with adding hop cost as a secondary metric for computing path costs.

FIG. 3 illustrates a system 300 associated with computing a path cost that includes hop cost as a secondary metric. Adding hop cost facilitates distinguishing otherwise equal cost multi-paths. System 300 includes a link cost logic 310 to calculate a link cost for a plurality of paths in a network of switches. The link cost may be the cost of traversing links between switches on a path through the network. In one example, the link cost for a path is based, at least in part, on an administrative factor for a link divided by the signaling rate of the link. In one example, the administrative factor is multiplied by 1.0625e12. One skilled in the art will understand that other administrative factors may be used.

"Logic", as used with respect to system 300 and computer 500 (FIG. 5), includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics. "Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

System 300 may also include a hop cost logic 320 to calculate a hop cost for the plurality of paths in a network of switches. The hop cost may be determined by totaling individual hop costs on a path through the network. In one example, the individual hop cost varies with the associated switch that is traversed on a path through the network. In another example, the individual hop cost is a constant number for switches in the network. While the link cost logic 310 and hop cost logic 320 are illustrated as separate logics, it is to be appreciated that link cost and hop cost may be computed substantially simultaneously on-the-fly as paths through the network of switches are identified.

System 300 may also include a total cost logic 330 to compute the link cost and the hop cost to calculate a modified link cost. The modified link cost may be calculated using various approaches. For example, the modified link cost may be computed according to:

$$\text{Modified Link Cost} = S^*(1.0625e12/\text{Signaling Rate}) + K_{switch}$$

where $K_{switch}$ is the constant cost of traversing through a switch, and S is an administrative factor. In one embodiment the switches in the network use the same value for $K_{switch}$. One skilled in the art will appreciate that S and $K_{Switch}$ may take on different values in different examples. Similarly, one skilled in the art will appreciate that values other than 1.0625e12 may be employed.

In another example, the modified link cost may initially be just the link cost. In this example, system 300 may compare the link costs of the paths and detect that a multiplicity of paths share the lowest link cost. The system 300 may then calculate the modified link cost for just the multiplicity of paths sharing the lowest link cost by calculating the hop costs for those paths. One skilled in the art will appreciate that arithmetically this approach yields the same result.

System 300 may also include a selection logic 340 to select the path through the network with the lowest modified link cost. The selection logic 340 may compare the modified link costs of the different paths in order to select the path with the lowest modified cost. In different examples the comparison may be performed in the total cost logic 330 and/or the selection logic 340.

Figure 4:
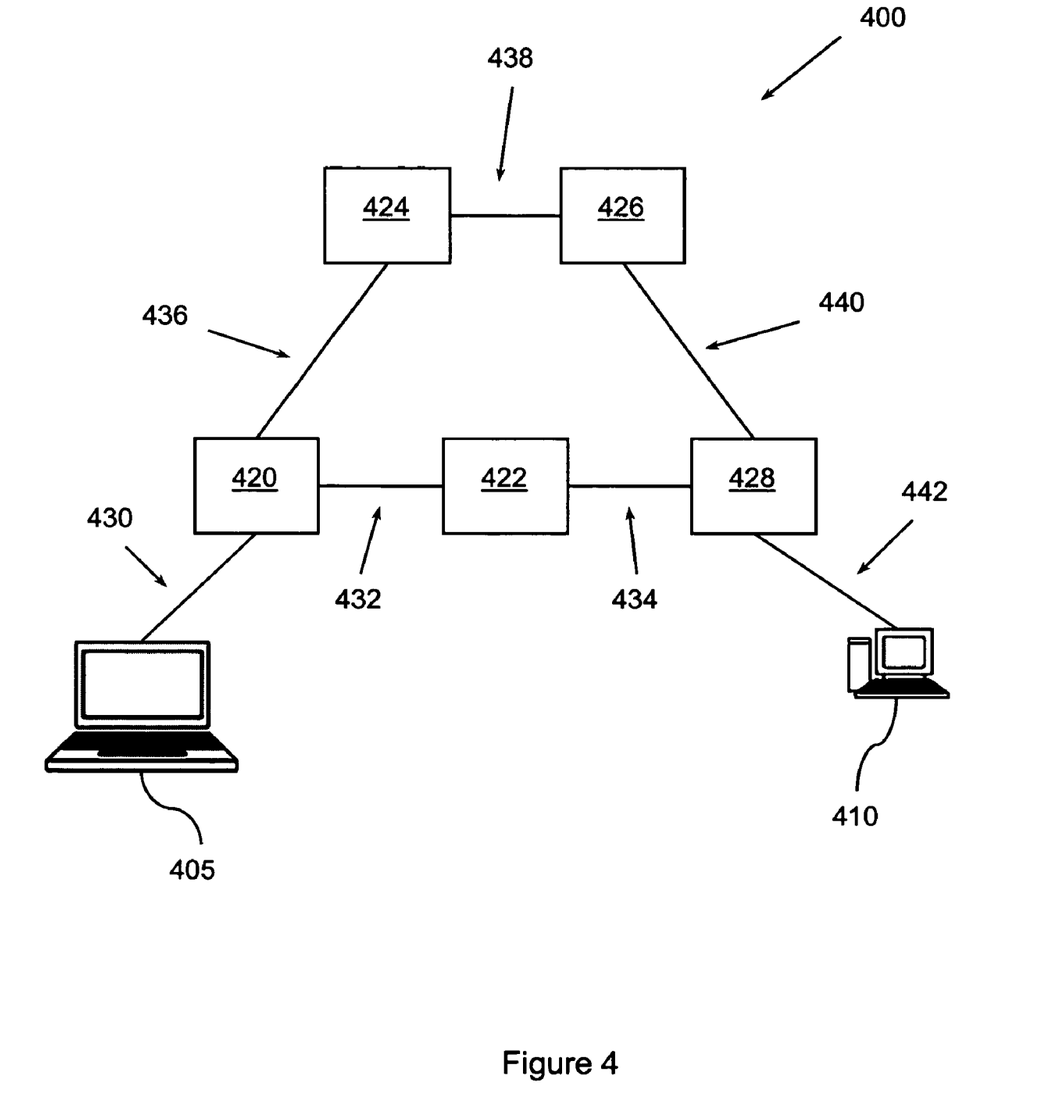
FIG. 4 illustrates an example environment associated with adding hop cost as a secondary metric for computing path costs.

FIG. 4 shows a network 400 that demonstrates link costs of a network and numbers of switches traversed along different data paths through the network. Additionally, FIG. 4 shows how a modified link cost calculation provides a more desirable routing path to destinations that would otherwise be reachable through a multiplicity of equally costed paths.

Fibre channel network 400 includes a host 405, a target 410, and five switches. In this figure, switches are labeled 420, 422, 424, 426, and 428. The links are labeled 430, 432, 434, 436, 438, 440, and 442. In the following example, bandwidth costs for links 432, 434, and 438 are 500. Links 436 and 440 have bandwidth costs of 250.

As described and shown in FIG. 4, the cost of transferring data from the host 405 to the target 410 along switches 420-424-426-428 is the same as that along switches 420-422-428 when using a traditional link cost calculation. For example, the cost of traveling switches 420-424-426-428 is the cost of their links 436-438-440, which in bandwidth cost is 250+500+250=1,000. The cost of traveling switches 420-422-428 is the cost of traveling their links 432-434, which in bandwidth cost is 500+500=1,000. Hence these two paths will be treated as equal cost multi-paths (ECMPs) by switch 420 because both have a bandwidth cost of 1,000. The path traversing switches 436-438-440 offers fewer links to traverse. However, it does not receive a preference when using traditional link cost calculations.

As described above, the link cost for a link in Fabric Shortest Path First (FSPF) is calculated based on the baud rate (e.g. signaling rate) of the link, plus an administratively set factor. The calculation may be performed on a link by link basis. Links in the network may be advertised with a different cost. For example, when the link cost is calculated for a 1.0625 GBit/s Fibre Channel Link, this calculation yields (with S set to 1.0):

$$1.0*(1.0625e12/1.0625e9)=1000$$

Similarly, cost for 2 GBit/s link will be 500, for 4 GBit/s link will be 250 and 8 GBit/s link will have cost of 125. As the bandwidth of the link increases its associated link cost decreases. FIG. 4 illustrates that the following invariant exists among the paths from source to destination:

$$num_{links}=num_{hops}+1$$

The number of links from source to destination is one more than number of hops. Hops may be the number of switches traversed in a path. Hence the problem of minimizing links traversed can be reduced to the problem of minimizing hops traversed. The FSPF link cost calculation formula may be modified to reflect the fact that data is also traveling through switches. The modified link cost formula for a FSPF link cost calculation may be as follows:

$$\text{Modified Link Cost}=S*(1.0625e12/\text{Signaling Rate})+K_{switch}[A]$$

$K_{switch}$ is the constant cost of traversing through a switch. In one embodiment the switches in the network use same value for $K_{switch}$. $K_{switch}$ may be the hop cost associated with transitioning (e.g. hopping) a switch.

In another, example using the modified link cost calculation returns a different result than the previous unmodified calculation. In this calculation the switches use the modified link cost formula A (modified link cost calculation) with the value of $K_{switch}$ set to 1. It can be seen that the path traveling switches 420-422-428 has a cost of 1002, while the path traveling switches 420-424-426-428 has a cost of 1003. Hence, when the lowest cost path is determined using formula A, switch 420 will forward data to switch 422, thereby selecting the path with the least number of hops (e.g. switch traversals).

Figure 5:
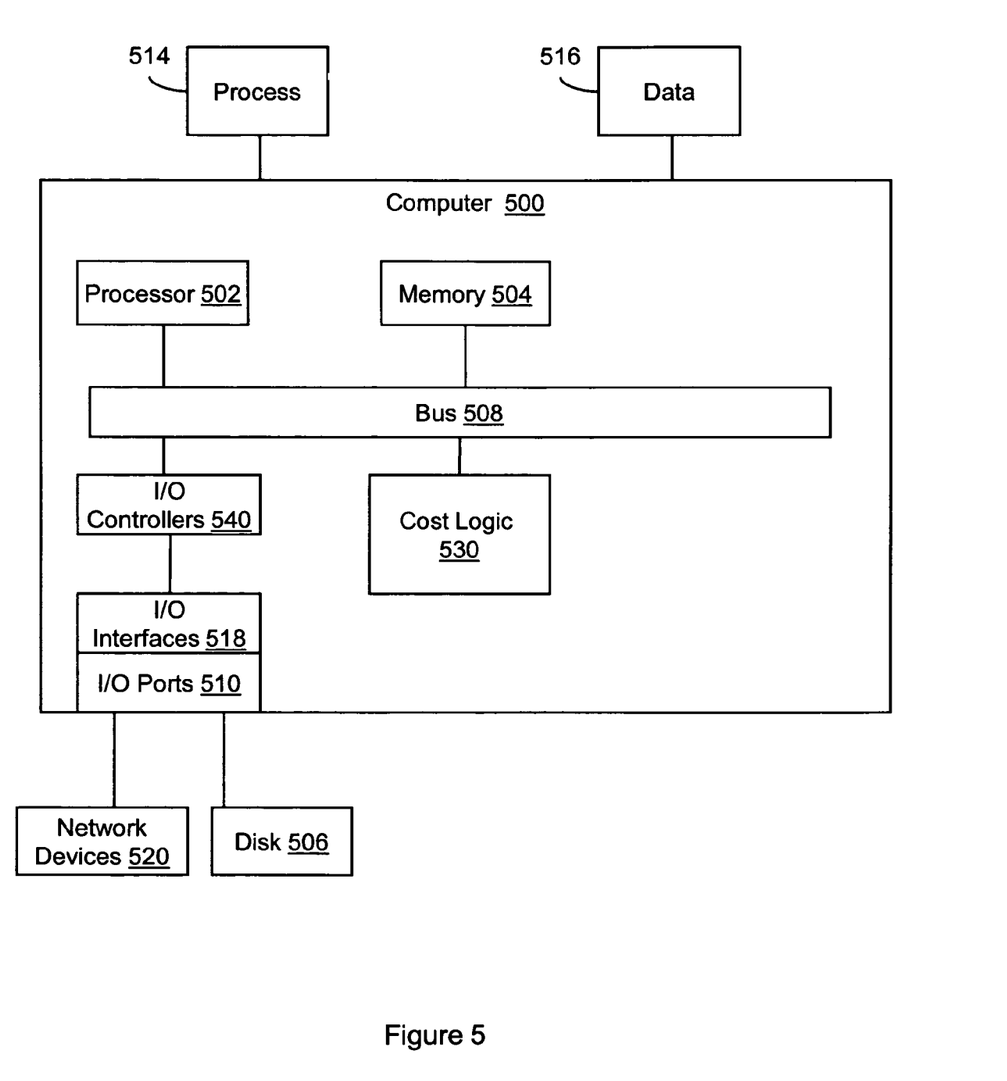
FIG. 5 illustrates an example computing environment in which example systems and methods, and equivalents, may operate to compute path costs including hop cost as a secondary metric.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a cost logic 530 configured to facilitate identifying link costs and hop costs for paths through a set of switches and for selecting the lowest cost path through the set of switches. In different examples, the cost logic 530 may be implemented in hardware, software, firmware, and/or combinations thereof. While the logic 530 is illustrated as a hardware component attached to the bus 508, it is to be appreciated that in one example, the cost logic 530 could be implemented in the processor 502 or as a computer component. "Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

Cost logic 530 may provide means (e.g., hardware, software, firmware) for identifying link costs and hop costs for paths through a set of switches. Cost logic 530 may also provide means for selecting the lowest cost path through the set of switches. The means associated with cost logic 530 may be implemented, for example, as an ASIC programmed to receive inputs and control computer 500. The means may also be implemented as computer executable instructions that are presented to computer 500 as data 516 that are temporarily stored in memory 504 and then executed by processor 502.

The cost logic 530 may calculate path costs using various methods. For example, the path cost may be calculated as described above according to:

$$\text{Modified Link Cost}=S*(1.0625e12/\text{Signaling Rate})+K_{switch}$$

$K_{switch}$ is the constant cost of traversing through a switch. In one embodiment the switches in the network use the same value for $K_{switch}$. $K_{switch}$ may be the hop cost associated with transitioning (e.g. hopping) a switch.

However, in another example, the path cost calculation may be computed initially without the $K_{switch}$ factor. First the link cost may be calculated for paths through a network of switches. The link costs of the paths may be compared to detect whether a multiplicity of paths share the lowest link cost. If a multiplicity of equal cost paths exist, then the path cost may be recomputed to include hop costs for the multiplicity of paths that share the lowest link cost.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, read only memory (ROM), programmable ROM (PROM), and so on. Volatile memory may include, for example, random access memory (RAM), synchronous RAM (SRAM), dynamic RAM (DRAM), and so on.

A disk 506 may be operably connected to the computer 500 via, for example, an input/output interface (e.g., card, device) 518 and an input/output port 510. An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection. The disk 506 may be, for example, a magnetic disk drive, a solid state disk drive, a floppy disk drive, a tape drive, a Zip drive, a flash memory card, a memory stick, and so on. Furthermore, the disk 506 may be a compact disc (CD), a CD-ROM drive, a CD recordable (CD-R) drive, a CD rewritable (CD-RW) drive, a digital versatile disk ROM (DVD ROM) drive, a Blu-Ray drive, an high definition DVD (HD-DVD) drive, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and universal serial bus (USB) ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
    automatically computing a modified link cost for each path in a plurality of paths between switches, the modified link cost for each path being based, at least in part, on an administrative factor for a link divided by the signaling rate of the line and on a hop cost associated with the path, the hop cost associated with the path being the sum of hop costs associated with each switch on the path, said hop costs associated with each switch on the path having constant values;
    automatically determining a lowest modified link cost associated with a path between the switches; and
    providing an output comprising the lowest modified link cost,
    wherein the individual hop cost for a switch is one and where the hop cost for a path is the number of links traversed in the path minus one.

2. The method of claim 1, wherein the administrative factor is multiplied by 1.0625e12.

3. The method of claim 1, further comprising establishing a path using the lowest modified link cost identified in the signal.

4. A computer-implemented method, comprising:
    automatically calculating a link cost for a plurality of paths in a network of switches, where the link cost is the cost of traversing links between switches on a path through the network;
    automatically determining a lowest link cost associated with a path through the network of switches;
    automatically detecting that a multiplicity of paths share the same lowest link cost;
    automatically calculating a hop cost for each of the multiplicity of paths sharing the same lowest link cost, the hop cost associated with each path being the sum of hop costs associated with each switch on the path, said hop costs associated with each switch on the path having constant values; and
    providing an output comprising the path with the lowest hop cost from the multiplicity of paths that share the lowest link cost,
    wherein the individual hop cost for a switch is one and the hop cost for a path is the number of links traversed in the path minus one.

5. The method of claim 4, wherein the hop cost is the number of switches traversed on a path through the network.

6. The method of claim 4, wherein the method also includes establishing a path using the lowest hop cost identified in the signal.

7. The method of claim 4, wherein the link cost is the total of individual link costs of the links on a path through the network.

8. The method of claim 7, wherein an individual link cost is based on an administrative factor divided by the signaling rate of a link.

9. The method of claim 8, wherein the administrative factor is multiplied by 1.0625e12.

10. A system, comprising:
a link cost calculator configured to calculate a link cost for a plurality of paths in a network of switches, the link cost being the cost of traversing links between switches on a path through the network;
a hop cost calculator configured to calculate a hop cost for the plurality of paths in a network of switches, the hop cost being determined by taking the sum of individual hop costs on a path through the network, each of said individual hop costs having a constant value;
a total cost calculator configured to add the link cost and the hop cost to calculate a modified link cost; and
a selector configured to select a path through the network with the lowest modified link cost from the plurality of paths in a network of switches,
wherein the individual hop cost for a switch is one and the hop cost for a path is the number of links traversed in the path minus one.

11. The system of claim 10, where the link cost for a path is based, at least in part, on an administrative factor for a link divided by the signaling rate of the link.

12. The system of claim 11, where the administrative factor is multiplied by 1.0625e12.

13. A system, comprising:
a link cost calculator configured to identify link costs for paths through a set of switches;
a selector configured to select a multiplicity of paths having a lowest link cost;
a hop cost calculator configured to identify means for identifying hop costs for paths through the set of switches by taking the sum of the constant individual hop costs for each switch in the path;
a selector configured to select a path having a lowest hop cost from the multiplicity of paths having the lowest link cost; and
an output configured to provide the path having the lowest hop cost from the multiplicity of paths having the lowest link cost,
wherein the individual hop cost for a switch is one and the hop cost for a path is the number of links traversed in the path minus one.

* * * * *